United States Patent
Shiozaki et al.

(10) Patent No.: US 9,394,983 B2
(45) Date of Patent: Jul. 19, 2016

(54) TRANSMISSION DEVICE FOR WORK VEHICLES

(71) Applicant: Yanmar Co., Ltd., Osaka (JP)

(72) Inventors: Shuji Shiozaki, Osaka (JP); Takeshi Ouchida, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 52 days.

(21) Appl. No.: 14/599,118

(22) Filed: Jan. 16, 2015

(65) Prior Publication Data

US 2015/0133251 A1    May 14, 2015

Related U.S. Application Data

(63) Continuation of application No. 13/319,972, filed as application No. PCT/JP2010/057487 on Apr. 27, 2010, now Pat. No. 8,956,256.

(30) Foreign Application Priority Data

May 13, 2009  (JP) .................................. 2009-116039
May 13, 2009  (JP) .................................. 2009-116040

(51) Int. Cl.
  *F16H 47/02*  (2006.01)
  *F16H 39/04*  (2006.01)
  (Continued)

(52) U.S. Cl.
  CPC ................ *F16H 47/02* (2013.01); *F16H 47/04* (2013.01); *F16H 2037/0886* (2013.01); *F16H 2200/0004* (2013.01); *F16H 2200/2005* (2013.01)

(58) Field of Classification Search
  CPC ....... F16H 39/04; F16H 39/02; F16H 39/045; F16H 47/02; F16H 47/045
  USPC .......... 475/204, 200, 221, 329, 269, 296, 72, 475/83, 118, 207, 21, 216
  See application file for complete search history.

(56) References Cited

U.S. PATENT DOCUMENTS 3,939,732 A    2/1976  Giacosa
4,392,394 A    7/1983  Hofbauer et al.
(Continued)

FOREIGN PATENT DOCUMENTS

DE          101 23 105       11/2002
DE      10 2007 000 619       5/2009
(Continued)

OTHER PUBLICATIONS

International Search Report for PCT/JP2010/057487, Japanese Patent Office, mailed Aug. 17, 2010, 4 pages.
(Continued)

*Primary Examiner* — Robert Hodge
*Assistant Examiner* — Stacey Fluhart
(74) *Attorney, Agent, or Firm* — Sterne, Kessler, Goldstein & Fox P.L.L.C.

(57) ABSTRACT

Disclosed is a transmission device for work vehicles, said transmission device being capable of being used with high-horsepower engines, without an accompanying loss of power transmission efficiency or fuel economy. The transmission device is provided with: an input shaft that transmits power from an engine; a continuously-variable transmission that is disposed on the input shaft and outputs power transmitted from the input shaft, steplessly converting the speed thereof; and a reversing clutch device that outputs, either in a forward rotational direction or a reverse rotational direction, power outputted from the continuously-variable transmission. The reversing clutch device can be selectively switched, and the gear ratio can be steplessly changed by the continuously-variable transmission.

2 Claims, 10 Drawing Sheets

(51) Int. Cl.
*F16H 47/04* (2006.01)
*F16H 37/08* (2006.01)

(56) References Cited

U.S. PATENT DOCUMENTS

| | | | |
|---|---|---|---|
| 4,543,852 A | 10/1985 | Svab et al. | |
| 4,976,665 A * | 12/1990 | Hagin et al. | 475/80 |
| 5,423,183 A | 6/1995 | Folsom | |
| 5,941,789 A | 8/1999 | McCarrick et al. | |
| 6,450,912 B2 * | 9/2002 | Todeschini | F16H 47/04 |
| | | | 475/72 |
| 6,793,603 B2 * | 9/2004 | Teraoka | B60K 17/34 |
| | | | 475/204 |
| 7,832,520 B2 | 11/2010 | Murakami et al. | |
| 2003/0036451 A1 | 2/2003 | Weeramantry et al. | |
| 2006/0003861 A1 * | 1/2006 | Weeramantry | 475/72 |
| 2007/0004547 A1 * | 1/2007 | Ripamonti | F16H 47/04 |
| | | | 475/72 |
| 2009/0227421 A1 | 9/2009 | Saito | |
| 2009/0280944 A1 * | 11/2009 | Hiraoka | F16H 37/042 |
| | | | 475/116 |
| 2010/0147107 A1 * | 6/2010 | Janson | B60K 17/344 |
| | | | 74/665 T |
| 2012/0225746 A1 * | 9/2012 | Hiraoka | B60W 30/18036 |
| | | | 475/72 |
| 2013/0068545 A1 * | 3/2013 | Cronin | F16H 47/04 |
| | | | 180/9.1 |

FOREIGN PATENT DOCUMENTS

| | | |
|---|---|---|
| JP | 06-101744 | 4/1994 |
| JP | 2000-335265 | 12/2000 |
| JP | 2001-108060 | 4/2001 |
| JP | 2003-130215 | 5/2003 |
| JP | 2008-025630 | 2/2008 |
| JP | 2008-189144 | 8/2008 |
| JP | 2008-281204 | 11/2008 |
| JP | 2009-008190 | 1/2009 |
| JP | 2014-211166 | 11/2014 |

OTHER PUBLICATIONS

Supplementary European Search Report for EP Application No. 10 77 4834, Eurpean Patent Office, mailing date Oct. 29, 2013, 6 pages.

* cited by examiner

TRANSMISSION DEVICE FOR WORK VEHICLES

TECHNICAL FIELD

The present invention relates to art of transmission device installed in work vehicles. In particular, the present invention relates to art of power transmission which is done inside transmission device.

BACKGROUND ART

Conventionally, in the field of transmission device for work vehicles, power from an engine was distributed into two courses; in one course power was transmitted to a planetary gear mechanism; in the other course power was transmitted to the planetary gear mechanism after transmitted to a Hydraulic Static Transmission (here in after referred to as "HST"), steplessly converting the speed thereof; and then, power from those two courses were combined by the planetary gear mechanism and outputted. Comprising the transmission device for work vehicles as described above has become public knowledge (for example, see the Patent Literature 1).

In order to make the transmission device capable of being used with high-horse power engines, it is necessary to (A) mount large volumetric HST on the work vehicles, or (B) use more than two planetary gear mechanisms to compose a complex power transmission mechanism.

However, using a means (A) or (B) as described above or the like have recognized disadvantageous in that it accompanies a loss of power transmission efficiency or fuel economy. Moreover, using those means have recognized disadvantageous in that the size of the transmission device becomes larger and it will be difficult to mount such transmission device on work vehicles.

PRIOR ART DOCUMENTS

Patent Literature

Patent Literature 1: the Japanese Patent Laid Open Gazette 2001-108060

DISCLOSURE OF INVENTION

Problems to be Solved by the Invention

The present invention is provided in consideration of the above problems, and the purpose of the present invention is to provide a transmission device for work vehicles capable of being used with high-horsepower engines, without an accompanying loss of power transmission efficiency or fuel economy. Another purpose of the present invention is to provide a transmission device for work vehicles capable of being used with high-horsepower engines, without growth of the transmission device in size.

Means for Solving the Problems

The above-mentioned problems are solved by the following means.

Briefly stated, the present invention comprises: an input shaft that transmits power from a drive source; a continuously-variable transmission that is disposed on the input shaft and outputs power transmitted from the input shaft, steplessly converting the speed thereof; and a reversing clutch device that outputs, either in a forward rotational direction or a reverse rotational direction, power outputted from the continuously-variable transmission. In the present invention, the reversing clutch device is selectively switched and the gear ratio is steplessly changed by the continuously-variable transmission so as to perform speed change operation.

The present invention comprises: a combining clutch device that outputs power outputted from the continuously-variable transmission; and a planetary gear mechanism that combines power from the drive source and power outputted from the combining clutch device into combined power and outputs the combined power. In the present invention, the reversing clutch device and the combining clutch device are selectively switched and the gear ratio is steplessly changed by the continuously-variable transmission so as to perform speed change operation.

The present invention comprises: a planetary gear mechanism that combines power from the drive source and other power into combined power and outputs the combined power; and a combining clutch device that outputs power or transmits power to the planetary gear mechanism outputted from the reversing clutch device. In the present invention, the reversing clutch device and the combining clutch device are selectively switched and the gear ratio is steplessly changed by the continuously-variable transmission so as to perform speed change operation.

In the present invention, the input shaft, the continuously-variable transmission, and the reversing clutch device are disposed upstream of a differential gear mechanism, which distributes power to a right wheel and a left wheel, on the power transmission course.

In the present invention, the planetary gear mechanism is disposed between the input shaft and the differential gear mechanism; a first transmission part of the planetary gear mechanism is interlocked with the input shaft; a second transmission part of the planetary gear mechanism is interlocked with the continuously-variable transmission; a third transmission part of the planetary gear mechanism is interlocked with the input unit of the differential gear mechanism.

In the present invention, on the basis of axial direction of the input shaft, the reversing clutch device and the combining clutch device are disposed between the planetary gear mechanism and the continuously-variable transmission.

In the present invention, the continuously-variable transmission is disposed near the rear side of a transmission case.

Effect of the Invention

The present invention constructed as the above brings the following effects.

According to the present invention, the rotational direction of output power can be selectively switched by means of switching the reversing clutch device. Additionally, vehicle speed of work vehicles can be converted by means of changing the gear ratio steplessly by the continuously-variable transmission. Moreover, the continuously-variable transmission and the reversing clutch device are available as shift transmission elements of the transmission device for work vehicles by means of combining the continuously-variable transmission and the reversing clutch device with other shift transmission elements (for example, a planetary gear mechanism or the like). Consequently, the continuously-variable transmission and the reversing clutch device can be used in various types of transmission devices (for example, transmission devices each of which corresponding to different amount of horsepower of drive source). By means of sharing the continuously-variable transmission and the reversing clutch device among various types of transmission devices, it is possible to reduce cost, reduce parts count, and shorten the development period.

According to the present invention, it is possible to output power directly from the continuously-variable transmission. And it is also possible to combine power from the continuously-variable transmission and power from the drive source into combined power and output the combined power. Consequently, by means of selectively switching the reversing clutch device and the combining clutch device, steplessly changing the gear ratio by the continuously-variable transmission, it is possible to convert vehicle speed of work vehicles in a wide range corresponding to the output power of the drive source.

According to the present invention, the transmission device for work vehicles is capable of being corresponded to high-horsepower engines without growth of the transmission device in size.

Figure 1:
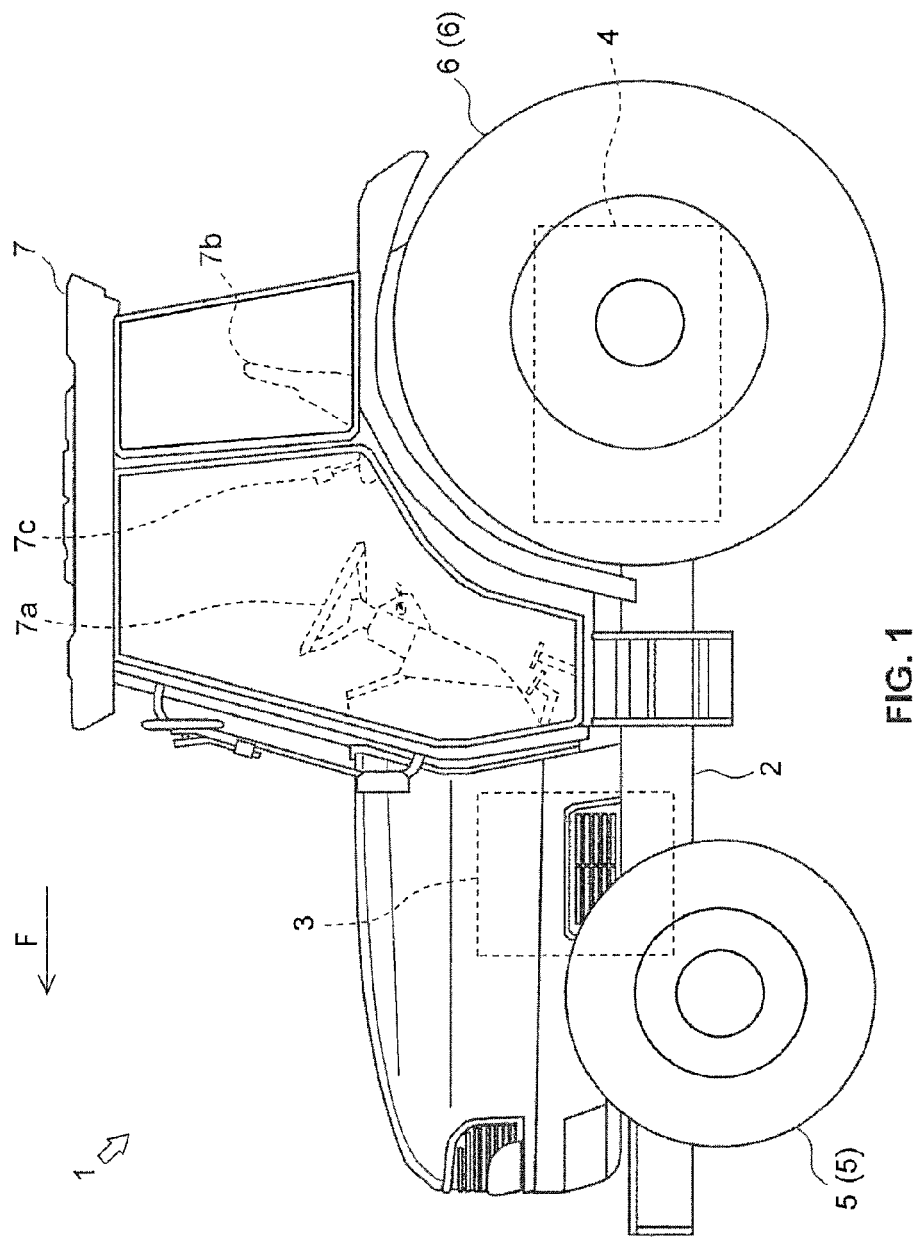
FIG. 1 It is a side view of entire construction of a work vehicle comprising a transmission device which is a first embodiment of the present invention.

DESCRIPTION OF NOTATIONS 1 work vehicle
3 engine (drive source)
4 transmission device
6 rear wheel (wheel)
10 transmission case
20 input shaft
40 continuously-variable transmission
42 oil hydraulic pump
43 oil hydraulic motor
50 reversing clutch device
53a intermediate gear
55 first forward clutch
56 reverse clutch
60 combining clutch device
64 second forward clutch
65 third forward clutch
70 planetary gear mechanism
71 carrier (first transmission part)
73 sun gear (second transmission part)
74 outer gear (third transmission part)
80 auxiliary transmission mechanism
83 auxiliary transmission output shaft (input unit of the differential gear mechanism)
90 differential gear mechanism

THE BEST MODE FOR CARRYING OUT THE INVENTION

Next, explanation will be given on a work vehicle 1 comprising a transmission device 4 which is an embodiment of a transmission device for work vehicles in accordance with the present invention. In below explanation, direction of an arrow F in the drawings is defined as front direction.

As shown in FIG. 1, the work vehicle 1 is used for farm work and construction work in diverse ways by installing rotary tiller and other tilling device, or loader and other implement. The work vehicle 1 is mainly comprised of a body frame 2, an engine 3, the transmission device 4, front wheels 5, rear wheels 6, and a cabin 7.

The body frame 2 is the main structure of the work vehicle 1. The body frame 2 is composed of several pieces of lumber, adjusting its longer direction to front-back direction of the work vehicle 1.

The engine 3 is a drive source which generates power for driving the work vehicle 1. The engine 3 is mounted on the front portion of the body frame 2.

The transmission device 4 converts the output speed of power generated by the engine 3. The transmission device 4 is mounted on the rear portion of the body frame 2.

The two front wheels 5 are disposed on the right side and left side of the front portion of the body frame 2 respectively.

The two rear wheels 6 are disposed on the right side and left side of the rear portion of the body frame 2 (the transmission device 4) respectively.

The front wheels 5 and the rear wheels 6 are rotatably driven by power whose output speed is converted by the transmission device 4.

The cabin 7 covers the space where the operator of the work vehicle 1 boards. The cabin 7 extends from the central portion to the rear portion of the body frame 2, on the basis of front-back direction. There are a handle 7a, a seat 7b, a gearshift lever 7c, and other members in the cabin 7.

The handle 7a is provided for steering and operating the work vehicle 1. The handle 7a is disposed in the front portion of the cabin 7.

The seat 7b is where the operator sits. The seat 7b is disposed behind the handle 7a.

The gearshift lever 7c is provided for setting the vehicle speed of the work vehicle 1 by setting the transmission gear ratio of the transmission device 4. The gearshift lever 7c is disposed on the right side of the seat 7b. The gearshift lever 7c is an embodiment of a transmission gear ratio setting unit in accordance with the present invention.

In the following explanation, construction of the transmission device 4 which is a first embodiment of a transmission device in accordance with the present invention will be described, referring now to FIG. 2 and FIG. 3. The transmission device 4 is mainly comprised of a transmission case 10, an input shaft 20, a continuously-variable transmission 40, a reversing clutch device 50, a combining clutch device 60, a planetary gear mechanism 70, an auxiliary transmission mechanism 80, and a differential gear mechanism 90.

Figure 3:
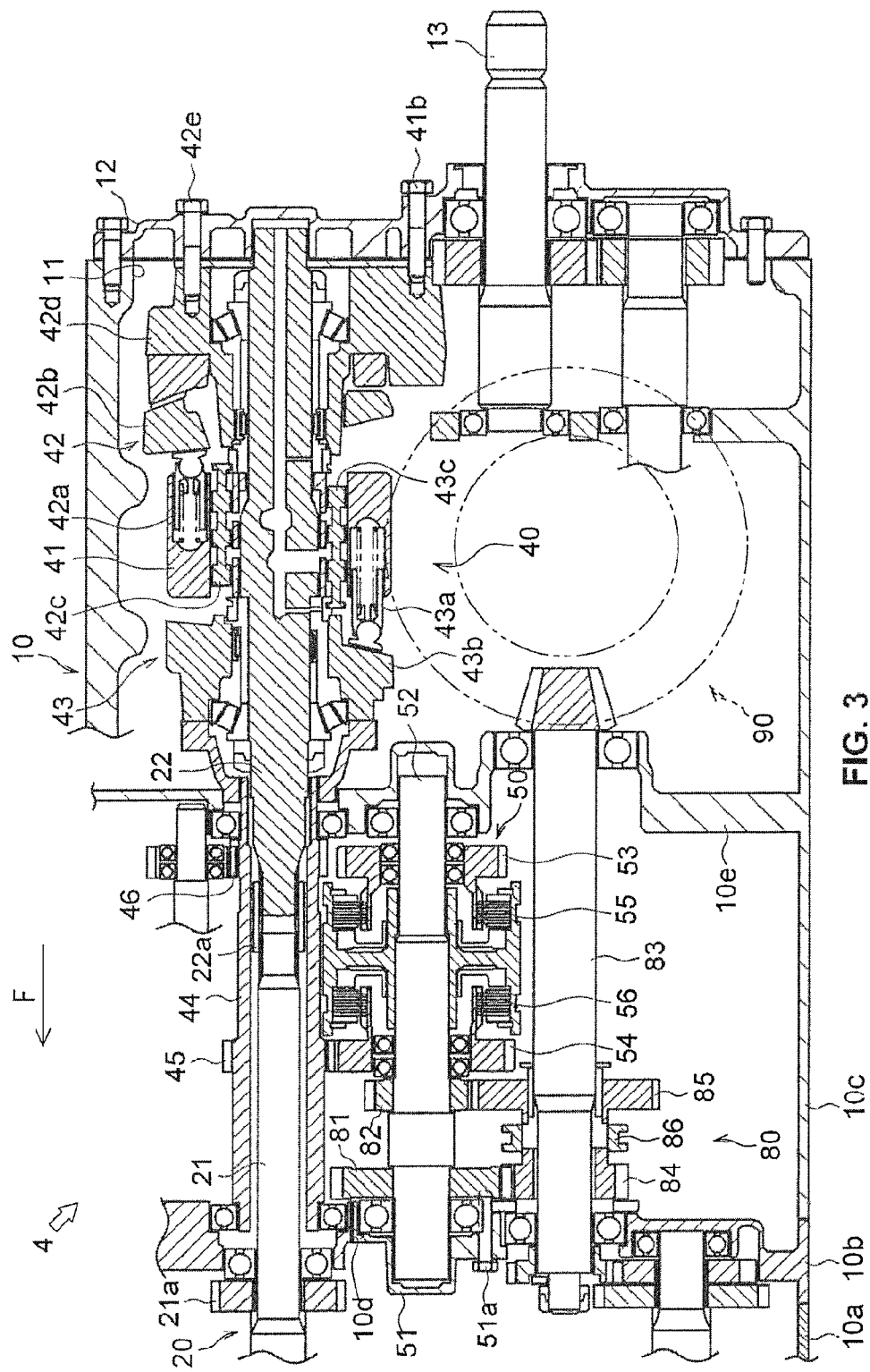
FIG. 3 It is a sectional side elevation illustrating the transmission device.

As shown in FIG. 3, the transmission case 10 is a boxlike member who houses a variety of shafts and gears and other members composing a power transmission course of the transmission device 4. More specifically, the transmission case 10 houses the input shaft 20, the continuously-variable transmission 40, the reversing clutch device 50, and other members which are described below.

The transmission case 10 is mainly composed of a front case 10a, a front supporting wall 10b, and a rear case 10c. The front supporting wall 10b is fixed on the rear portion of the front case 10a. An opening 10d is made in the central portion of the supporting wall 10b, passing the supporting wall 10b completely through to the other side in front-back direction. The rear case 10c is fixed on the rear portion of the front supporting wall 10b. A supporting wall part 10e is made inside the rear case 10c. The supporting wall part 10e is disposed on the middle portion of the rear case 10c on the basis of front-back direction, extending in crosswise direction forming a vertical plane.

An opening portion 11 is made in the rear portion of the transmission case 10, opening at the rear side. The opening portion 11 is covered with a PTO cover 12 which is fixed on the rear portion of the transmission case 10 by specified fastener members. In other words, the PTO cover 12 is a member which constitutes the rear side plane of the transmission case 10. A PTO output shaft 13, which is provided for transmitting power to the mounted implement of the work vehicle 1, is projected rearward from the PTO cover 12.

Figure 2:
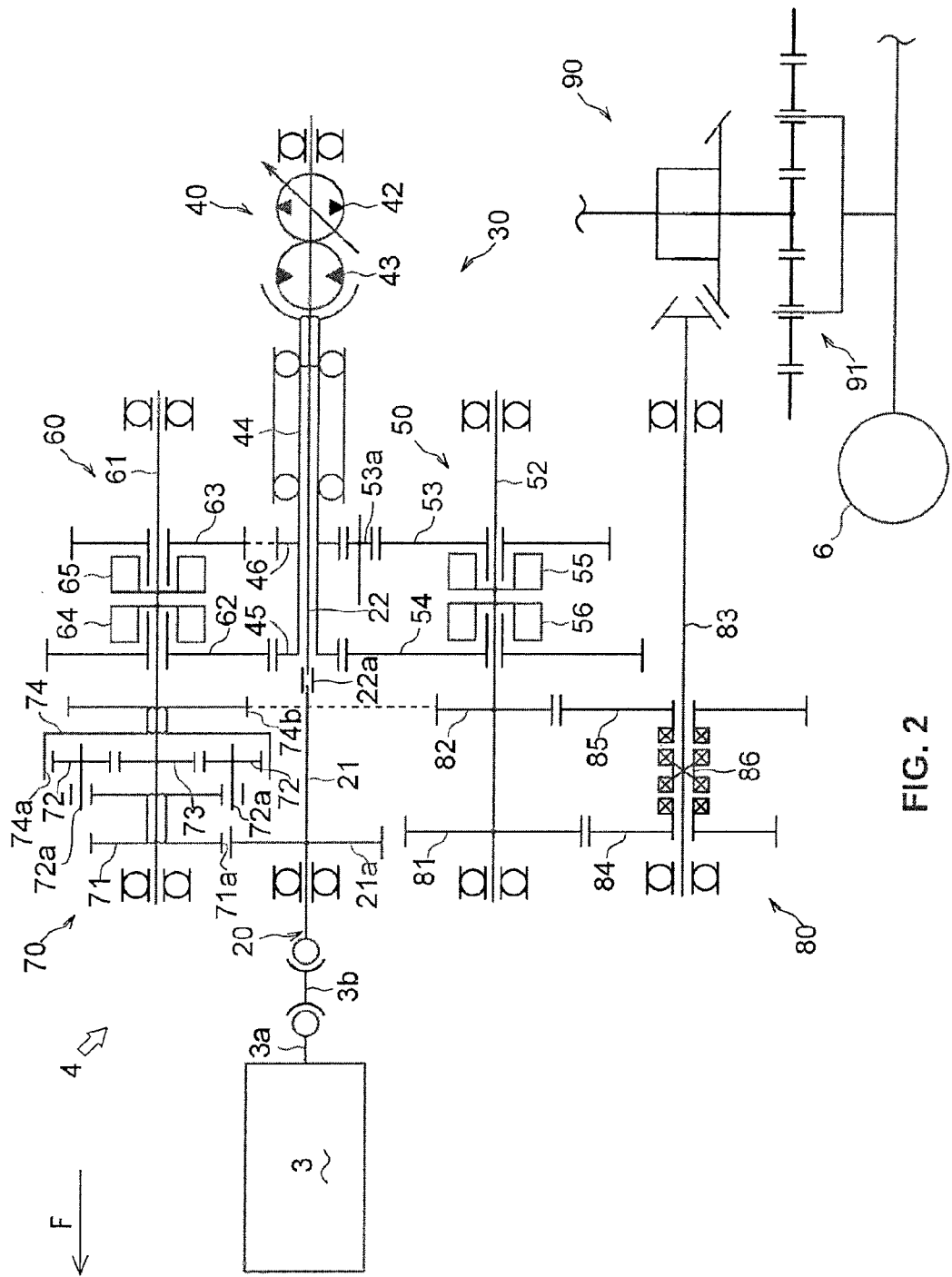
FIG. 2 It is a schematic diagram illustrating the transmission device.

As shown in FIG. 2 and FIG. 3, the input shaft 20 is a member rotatably driven by power generated by engine 3. The input shaft 20 is mainly comprised of a first input shaft 21 and a second input shaft 22.

The front end portion of the first input shaft 21 is interlockingly connected to an output shaft 3a of the engine 3; between the first input shaft 21 and the output shaft 3a, there is a drive shaft 3b disposed. The rear end portion of the first input shaft 21 is extended rearward. An engine power output gear 21a is fixed in the middle of the input shaft 21.

The second input shaft 22 is disposed behind the first input shaft 21; the second input shaft 22 is disposed concentrically with the first input shaft 21. The front end portion of the second input shaft 22 is interlockingly connected to the rear end portion of the first input shaft 21; between the second input shaft 22 and the first input shaft 21, there is a shaft coupling 22a. The rear end portion of the second input shaft 22 is rotatably supported by the PTO cover 12.

The continuously-variable transmission 40 is provided for outputting the inputted power, steplessly converting the speed thereof. The continuously-variable transmission 40 is mainly comprised of a cylinder block 41, an oil hydraulic pump 42, an oil hydraulic motor 43, an output shaft 44, a first output gear 45, and a second output gear 46.

The cylinder block 41 is a member having the form of a column. Several holes, into which input side plungers 42a, input side spool valves 42c, output side plungers 43a, and output side spool valves 43c, which are described below, are inserted respectively, are made in the cylinder block 41. The second input shaft 22 is inserted into a hole which is made in the shaft center portion of the cylinder block 41; the second input shaft 22 is splined to the cylinder block 41. Accordingly, the cylinder block 41 rotates integrally with the second input shaft 22.

The oil hydraulic pump 42 is a variable displacement type oil hydraulic pump which is made to be able to alter its volume. The oil hydraulic pump 42 is mainly comprised of the input side plungers 42a, an input side swash plate 42b, and the input side spool valves 42c.

The input side plungers 42a are inserted into several holes which are made in the cylinder block 41. The input side plungers 42a are provided for inhalation and excretion of hydraulic oil.

The input side swash plate 42b is fixed to the PTO cover 12 by bolts 42e; between the input side swash plate 42b and the PTO cover 12, there is a rear part housing 42d disposed. The input side swash plate 42b is a plate-like member which is made to be able to alter the skew angle $\alpha$ with edspect to the axial direction of the second input shaft 22. In this embodiment, the skew angle $\alpha$ of the input side swash plate 42b, on the basis of the axial direction of the rotating shaft (the second input shaft 22) of the cylinder block 41, is changeable in the range of $-\alpha m$ to $\alpha m$. The projecting ends of the input side plungers 42a touch the input side swash plate 42b.

The input side spool valves 42c are inserted into several holes which are made in the cylinder block 41. The input side spool valves 42c are provided for switching the oil passage of hydraulic oil inhaled or excreted by the input side plungers 42a.

The oil hydraulic pump 42 is composed as described above. Accordingly, if the cylinder block 41 rotates while the input side swash plate 42b is tilting, the input side plungers 42a and the input side spool valves 42c, inserted in the holes made in the cylinder block 41, are reciprocated in the axial direction, rotating around the second input shaft 22 with the cylinder block 41. If the input side plungers 42a are reciprocated in the holes made in the cylinder block 41, the spool valves 42c switch the oil passage, and thus, hydraulic oil can be inhaled or excreted.

The oil hydraulic motor 43 is a fixed displacement type oil hydraulic motor which is made to be unable to alter its volume. The oil hydraulic motor 43 is mainly comprised of the output side plungers 43a, an output side swash plate 43b, and the output side spool valves 43c.

The output side plungers 43a are inserted into several holes which are made in the cylinder block 41. The output side plungers 43a are provided for inhalation and excretion of hydraulic oil.

The output side swash plate 43b is a plate-like member which is made to be unable to alter the skew angle with respect to the axial direction of the second input shaft 22. The output side swash plate 43b is disposed on the second input shaft 22, in front of the cylinder block 41. The output side swash plate 43b is rotatable around the second input shaft 22. The projecting ends of the output side plungers 43a touch the output side swash plate 43b.

The output side spool valves 43c are inserted into several holes which are made in the cylinder block 41. The output side spool valves 43c are provided for switching the oil passage of hydraulic oil inhaled or excreted by the output side plungers 43a.

The oil hydraulic motor 43 is composed as described above. Accordingly, if hydraulic oil is supplied to the oil hydraulic motor 43 from the oil hydraulic pump 42, the output side plungers 43a are reciprocated in the axial direction in the holes of the cylinder block 41. The output side swash plate 43b is rotatable around the cylinder block 41 due to the reciprocating motion of the output side plungers 43a.

The output shaft 44 is a member which rotates integrally with the output side swash plate 43b. The shaft center portion of the output shaft 44 is hollowed, forming a hollow shaft. The input shaft 20 is inserted into the hollowed shaft of the output shaft 44. The rear end of the output shaft 44 is fixed to the output side swash plate 43b.

The first output gear 45 is a gear wheel which is fixed to the front end of the output shaft 44.

The second output gear 46 is a gear wheel which is fixed to the output shaft 44. The second output gear 46 is disposed behind the output gear 45.

Figure 4:
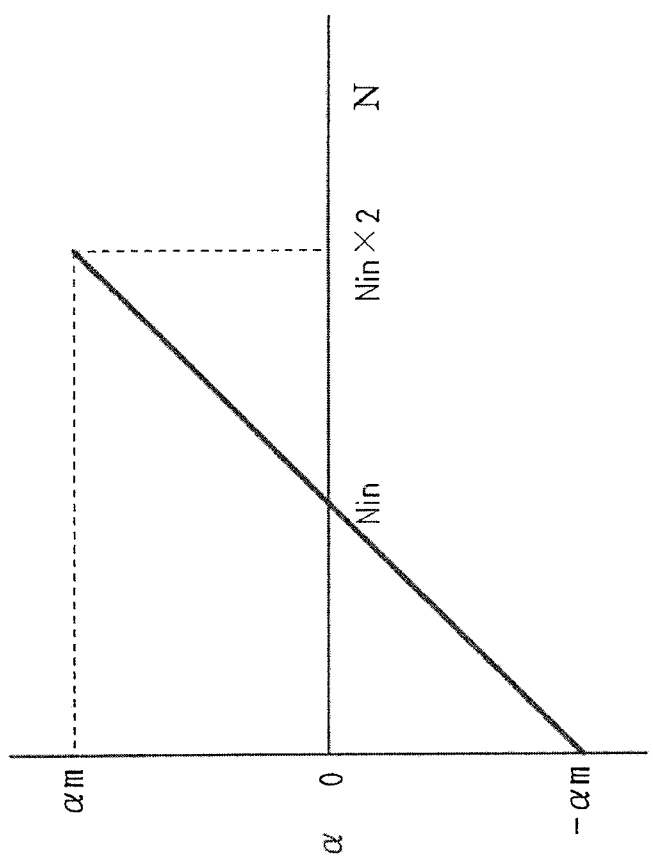
FIG. 4 It is a diagram showing the relation between skew angle of an input side swash plate and rotation speed of an input shaft.

Hereinafter, explanation will be given on an operation mode of the continuously-variable transmission 40 which is composed as described above, referring now to FIG. 3 and FIG. 4.

The cylinder block 41 is rotated by power transmitted from the engine 3 through the intermediary of the input shaft 20. The rotation speed of the input shaft 20 at that time (the rotation speed of the cylinder block 41) is defined as Nin.

If the input side swash plate 42b crosses at right angles with the rotational axis of the cylinder block 41 (the second input shaft 22), in other words, if the skew angle α of the input side swash plate 42b is zero, the input side plungers 42a do not move reciprocatory. Accordingly, since hydraulic oil is not supplied to the oil hydraulic motor 43 from the oil hydraulic pump 42, the output side plungers 43a do not move reciprocatory. As a result, the output side swash plate 43b rotates integrally with the cylinder block 41 at rotation speed of Nin. That is to say, the output shaft 44 rotates integrally with the input shaft 20 at rotation speed of Nin through the intermediary of the output side swash plate 43b and the cylinder block 41.

If the input side swash plate 42b is tilted to deceleration side (the −αm side, shown in FIG. 4), the output side swash plate 43b rotates in the direction opposite to the rotational direction of the input shaft 20 relative to the cylinder block 41 so as to run after the cylinder block 41. If the skew angle α of the input side swash plate 42b reaches −αm, the output side swash plate 43b rotates relative to the cylinder block 41 at rotation speed of Nin, the same rotation speed as that of the input shaft 20. Accordingly, the rotation speed N of the output shaft 44 reaches zero.

If the input side swash plate 42b is tilted to accelerating side (the αm side, shown in FIG. 4), the output side swash plate 43b rotates in the same direction with the rotational direction of the input shaft 20 relative to the cylinder block 41 so as to run ahead of the cylinder block 41. If the skew angle α of the input side swash plate 42b reaches αm, the output side swash plate 43b rotates relative to the cylinder block 41 at rotation speed of Nin, the same rotation speed as that of the input shaft 20. Accordingly, the rotation speed N of the output shaft 44 reaches twice the speed of Nin.

Moreover, by means of disposing the continuously-variable transmission 40 on the input shaft as described in this embodiment, the transmission device 4 becomes capable of being used with high-horsepower engines, without growth of the transmission device 4 in size.

As shown in FIG. 2 and FIG. 3, the reversing clutch device 50 is provided for outputting power transmitted from the output shaft 44. The reversing clutch device 50 is mainly comprised of a lid 51, a stop motion lever shaft 52, a first forward gear 53, a reverse gear 54, a first forward clutch 55, and a reverse clutch 56.

The lid 51 is a member which is provided for covering the opening 10d of the supporting wall 10b. The lid 51 is fixed to the supporting wall 10b by bolts 51a.

The stop motion lever shaft 52 is a member which is disposed in parallel to the input shaft 20 and the output shaft 44. The front end of the stop motion lever shaft 52 is rotatably supported by the lid 51. The rear end of the stop motion lever shaft 52 is rotatably supported by the supporting wall part 10e.

The first forward gear 53 is a gear wheel which is rotatably supported in the middle of the stop motion lever shaft 52. The first forward gear 53 is interlockingly connected with the second output gear 46 through the intermediary of an intermediate gear 53a (refer to FIG. 2).

The reverse gear 54 is a gear wheel which is rotatably supported by the stop motion lever shaft 52. The reverse gear 54 is disposed in front of the first forward gear 53. The reverse gear 54 is engaged with the first output gear 45.

The first forward clutch 55 is provided for transmitting power from the first forward gear 53 to the stop motion lever shaft 52, making and intercepting the transmission of power thereof. The first forward clutch 55 is fixed to the stop motion lever shaft 52. The first forward clutch 55 is disposed in front of the first forward gear 53.

The reverse clutch 56 is provided for transmitting power from the reverse gear 54 to the stop motion lever shaft 52, intercepting and making the transmission of power thereof. The reverse clutch 56 is fixed to the stop motion lever shaft 52. The reverse clutch 56 is disposed behind the reverse gear 54. The first forward clutch 55, the reverse clutch 56, an after-mentioned second forward clutch 64, and an after-mentioned third forward clutch 65 are comprised of hydraulic clutch respectively. Those clutches are able to "turn on" or "turn off" by switching the magnetic valve. A detection part, provided near the gearshift lever 7c, is connected to the magnetic valve. Because of this configuration, revolving operation of the gearshift lever 7c can be detected, and by means of this revolving operation, the first forward clutch 55 and the like can be switched.

Hereinafter, explanation will be given on an operation mode of the reversing clutch device 50 which is composed as described above.

The first forward gear 53 is rotatably driven by power transmitted from the second output gear 46 through the intermediary of the intermediate gear 53a. The reverse gear 54 is rotatably driven by power transmitted from the first output gear 45. Owing to the intermediary of the intermediate gear 53a between the first forward gear 53 and the second output gear 46, the first forward gear 53 is rotatably driven in the reverse direction of rotational direction of the reverse gear 54.

If the first forward gear 53 is connected with the stop motion lever shaft 52 by the first forward clutch 55, outputted power of the first forward gear 53 is transmitted to the stop motion lever shaft 52. In regard to this situation, the rotational direction of power transmitted to the stop motion lever shaft 52 is defined as the direction for moving the work vehicle 1 forward (here in after referred to as "forward rotational direction").

If the reverse gear 54 is connected with the stop motion lever shaft 52 by the reverse clutch 56, outputted power of the reverse gear 54 is transmitted to the stop motion lever shaft 52. In regard to this situation, the rotational direction of power transmitted to the stop motion lever shaft 52 is defined as the direction for moving the work vehicle 1 backward (here in after referred to as "reverse rotational direction").

Thus, by means of switching the first forward clutch 55 and the reverse clutch 56, the rotational direction of power transmitted to the stop motion lever shaft 52 can be switched, and accordingly, forward movement and backward movement of the work vehicle 1 can be switched.

Moreover, the reversing clutch device 50 is composed as one unit detachable from the transmission device 4. Specifically, by taking off the bolts 51a from the supporting wall 10b from the front side, the reversing clutch device 50 can be integrally pulled out ahead from the transmission case 10 as one unit. This will allow the reversing clutch device 50 to be maintained easily and to be put together easily.

Although the first forward clutch 55, which is provided for outputting power from the continuously-variable transmission 40 in a forward rotational direction, and the reverse clutch 56, which is provided for outputting power from the continuously-variable transmission 40 in a reverse rotational direction, are installed in the reversing clutch device 50 in this embodiment, the present invention is not limited to such configuration. That is to say, it is also possible to install the first forward clutch 55 and the reverse clutch 56 in the combining clutch device 60.

As shown in FIG. 2, the combining clutch device 60 is provided for outputting power transmitted from the output shaft 44. The combining clutch device 60 is mainly comprised of a countershaft 61, a second forward gear 62, a third forward gear 63, the second forward clutch 64, and the third forward clutch 65.

The countershaft 61 is a member which is disposed in parallel to the input shaft 20 and the output shaft 44.

The second forward gear 62 is a gear wheel which is rotatably supported in the middle of the countershaft 61. The second forward gear 62 is engaged with the first output gear 45.

The third forward gear 63 is a gear wheel which is rotatably supported by the countershaft 61. The third forward gear 63 is disposed behind the second forward gear 62. The third forward gear 63 is engaged with the second output gear 46 through the intermediary of the intermediate gear 53a.

The second forward clutch 64 is provided for transmitting power from the second forward gear 62 to the countershaft 61, making and intercepting the transmission of power thereof. The second forward clutch 64 is a low-speed clutch which outputs low-speed power transmitted from the continuously-variable transmission 40. The second forward clutch 64 is assembled on the countershaft 61. The second forward clutch 64 is disposed behind the second forward gear 62.

The third forward clutch 65 is provided for transmitting power from the third forward gear 63 to the countershaft 61, making and intercepting the transmission of power thereof. The third forward clutch 65 is a high-speed clutch which outputs high-speed power transmitted from the continuously-variable transmission 40. The third forward clutch 65 is assembled on the countershaft 61. The third forward clutch 65 is disposed in front of the third forward gear 63.

Hereinafter explanation will be given on an operation mode of the combining clutch device 60 which is composed as described above.

The second forward gear 62 is rotatably driven by power transmitted from the first output gear 45. The third forward gear 63 is rotatably driven by power transmitted from the second output gear 46 through the intermediary of the intermediate gear 53a. Owing to the intermediary of the intermediate gear 53a between the third forward gear 63 and the second output gear 46, the third forward gear 63 is rotatably driven in the reverse direction of the rotational direction of the second forward gear 62.

If the second forward gear 62 is connected with the countershaft 61 by the second forward clutch 64, outputted power of the second forward gear 62 is transmitted to the countershaft 61. If the third forward gear 63 is connected with the countershaft 61 by the third forward clutch 65, outputted power of the third forward gear 63 is transmitted to the countershaft 61.

Thus, by means of switching the second forward clutch 64 and the third forward clutch 65, the rotational direction of power transmitted to the countershaft 61 from the output shaft 44 can be switched.

The planetary gear mechanism 70 is provided for combining power from the engine 3 and power outputted from the output shaft 44 into combined power and for outputting the combined power. The planetary gear mechanism 70 is disposed in front of the combining clutch device 60. The planetary gear mechanism 70 is mainly comprised of a carrier 71, planetary gears 72, a sun gear 73, and an outer gear 74.

The carrier 71 is supported by the front end portion of the countershaft 61. The carrier 71 is relatively rotatable around the countershaft 61. The carrier 71 composes a first transmission part of the planetary gear mechanism 70. A gear wheel portion 71a with teeth formed on the periphery, is formed on the front end portion of the carrier 71. The gear wheel portion 71a of the carrier 71 is engaged with the engine power output gear 21a.

Each of the planetary gears 72 is rotatably supported by the rear end portion of the carrier 71 through the intermediary of planetary shafts 72a. The several planetary gears 72 are arranged concentrically around the countershaft 61.

The sun gear 73 is disposed on the countershaft 61. The sun gear 73, which is not rotatable around the countershaft 61, is supported by the countershaft 61. The sun gear 73 is disposed behind the carrier 71. The sun gear 73 composes a second transmission part of the planetary gear mechanism 70. The sun gear 73 is engaged with the planetary gears 72.

The outer gear 74 is disposed on the countershaft 61. The outer gear 74, which is rotatable around the countershaft 61, is supported by the countershaft 61. The outer gear 74 is disposed behind the sun gear 73. The outer gear 74 composes a third transmission part of the planetary gear mechanism 70. A gear wheel portion 74a with teeth formed on the inner periphery, is formed on the front end portion of the outer gear 74. A gear wheel portion 74b with teeth formed on the periphery, is formed on the rear end portion of the outer gear 74. The gear wheel portion 74a of the outer gear 74 is engaged with the planetary gears 72.

Hereinafter, explanation will be given on an operation mode of the planetary gear mechanism 70 which is composed as described above.

The carrier 71 is rotatably driven by power transmitted from the input shaft 20 through the intermediary of the engine power output gear 21a. Accordingly, the planetary shafts 72a are rotatably driven around the countershaft 61, and consequently, the planetary gears 72 are rotatably driven around the countershaft 61 (revolved around the countershaft 61).

Moreover, each of the planetary gears 72 is rotatably driven around the each planetary shaft 72a (rotated on its own planetary shaft 72a) by power transmitted from the countershaft 61 through the intermediary of the sun gear 73.

The outer gear 74 is rotatably driven by the planetary gears 72. Power of the outer gear 74 is outputted from the gear wheel portion 74b.

Thus, power transmitted from the input shaft 20 and power transmitted from the countershaft 61 is combined by the planetary gears 72, and the combined power is outputted from the outer gear 74.

As mentioned above, by means of disposing the reversing clutch device 50 and the combining clutch device 60 between the planetary gear mechanism 70 and the continuously-variable transmission 40 on the basis of axial direction of the input shaft 20, it is possible to make the transmission device 4 compact. Moreover, since it is possible to locate the reversing clutch device 50 and the combining clutch device 60 close to each other, structure of oil hydraulic circuit for controlling the motion of the reversing clutch device 50 and the combining clutch device 60 will be simplified.

As shown in FIG. 2 and FIG. 3, the auxiliary transmission mechanism 80 is provided for outputting the transmitted power after changing the gear ratio. The auxiliary transmission mechanism 80 is mainly comprised of a high-speed driving gear 81, a low-speed driving gear 82, an auxiliary transmission output shaft 83, a high-speed driven gear 84, a low-speed driven gear 85, and an auxiliary transmission clutch 86.

The high-speed driving gear 81 is a gear wheel which is fixed on the front end portion of the stop motion lever shaft 52.

The low-speed driving gear 82 is a gear wheel which is fixed to the stop motion lever shaft 52. The low-speed driving gear 82 is disposed behind the high-speed driving gear 81. The low-speed driving gear 82 is engaged with the gear wheel portion 74*b* of the outer gear 74.

The auxiliary transmission output shaft 83 is a member which is disposed in parallel to the stop motion lever shaft 52. The auxiliary transmission output shaft 83 composes an input unit of the below-mentioned differential gear mechanism 90. The front end of the auxiliary transmission output shaft 83 is rotatably supported by the front supporting wall 10*b*. The rear end of the auxiliary transmission output shaft 83 is rotatably supported by the supporting wall part 10*e*.

The high-speed driven gear 84 is a gear wheel which is rotatably supported by the front end portion of the auxiliary transmission output shaft 83. The high-speed driven gear 84 is engaged with the high-speed driving gear 81.

The low-speed driven gear 85 is a gear wheel which is rotatably supported by the auxiliary transmission output shaft 83. The low-speed driven gear 85 is disposed behind the high-speed driven gear 84. The low-speed driven gear 85 is engaged with the low-speed driving gear 82.

In this embodiment, the gear ratio between the low-speed driving gear 82 and the low-speed driven gear 85 is larger than the gear ratio between the high-speed driving gear 81 and the high-speed driven gear 84. In other words, if the rotation speed of the stop motion lever shaft 52 is constant, the rotation speed of the low-speed driven gear 85 is smaller than the rotation speed of the high-speed driven gear 84.

The auxiliary transmission clutch 86 is disposed behind the high-speed driven gear 84. At the same time, the auxiliary transmission clutch 86 is disposed in front of the low-speed driven gear 85. The auxiliary transmission clutch 86 is provided for switching between two modes; in a first mode, either the high-speed driven gear 84 or the low-speed driven gear 85 is interlockingly connected to the auxiliary transmission output shaft 83; in a second mode, neither the high-speed driven gear 84 nor the low-speed driven gear 85 is interlockingly connected to the auxiliary transmission output shaft 83, which means both the high-speed driven gear 84 and the low-speed driven gear 85 are relatively rotatable around the auxiliary transmission output shaft 83.

Hereinafter, explanation will be given on an operation mode of the auxiliary transmission mechanism 80 which is composed as described above.

If either the first forward clutch 55 or the reverse clutch 56 is activated, the stop motion lever shaft 52 is rotatably driven by power transmitted from the output shaft 44 of the continuously-variable transmission 40. Accordingly, the low-speed driving gear 82 and the high-speed driving gear 81 is rotatably driven.

Alternatively, if either the second forward clutch 64 or the third forward clutch 65 is activated, the low-speed driving gear 82 is rotatably driven by power transmitted from the outer gear 74 of the planetary gear mechanism 70. Accordingly, the stop motion lever shaft 52 and the high-speed driving gear 81 are rotatably driven.

The low-speed driven gear 85 is rotatably driven by power transmitted from the low-speed driving gear 82. The high-speed driven gear 84 is rotatably driven by power transmitted from the high-speed driving gear 81.

If the low-speed driven gear 85 is connected with the auxiliary transmission output shaft 83 by the auxiliary transmission clutch 86, outputted power of the low-speed driven gear 85 is transmitted to the auxiliary transmission output shaft 83. If the high-speed driven gear 84 is connected with the auxiliary transmission output shaft 83 by the auxiliary transmission clutch 86, outputted power of the high-speed driven gear 84 is transmitted to the auxiliary transmission output shaft 83.

Thus, by means of switching the auxiliary transmission clutch 86, the rotation speed of power transmitted to the auxiliary transmission output shaft 83 from the stop motion lever shaft 52 can be switched, and accordingly, vehicle speed of the work vehicle can be switched.

Additionally, by means of selectively switching the reversing clutch device 50 and the combining clutch device 60, either the power from the continuously-variable transmission 40 or the power from the planetary gear mechanism 70 can be selectively transmitted to the stop motion lever shaft 52, outputted therefrom. In this way, it is possible to output intended amount of power as needed.

The differential gear mechanism 90 is provided for distributing power transmitted from the auxiliary transmission mechanism 80 to right and left, outputting the power therefrom. The differential gear mechanism 90 is interlockingly connected to the rear end portion of the auxiliary transmission output shaft 83. That is to say, the differential gear mechanism 90 is disposed downstream of the power transmission course of the input shaft 20, the continuously-variable transmission 40, and the reversing clutch device 50. After distributed to right and left by the differential gear mechanism 90, the rotation speed of the transmitted power is decreased in speed by a final speed reducer 91, and then the distributed power is transmitted to the right rear wheel 6 and the left rear wheel 6.

In this embodiment, explanation for the power transmission course, whereby the power generated by the engine 3 is transmitted to the front wheels 5 and the PTO output shaft 13, is omitted.

Hereinafter, explanation will be given on the relation between rotation speed N of the output shaft 44 of the continuously-variable transmission 40 and vehicle speed V of the work vehicle 1, with regard to the work vehicle 1 comprising the above-mentioned transmission device 4, referring now to FIG. 2 and FIG. 5.

Figure 5:
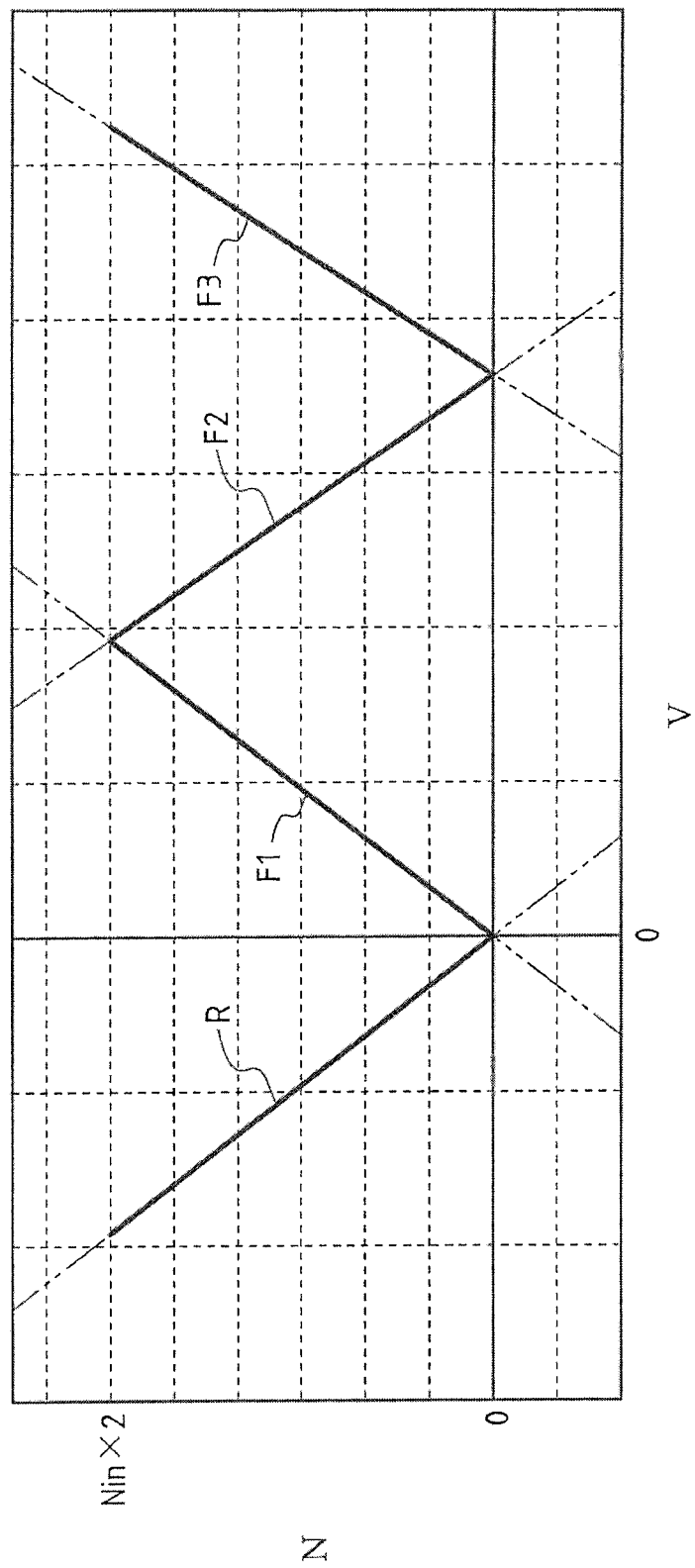
FIG. 5 It is a diagram showing the relation between rotation speed of the output shaft and vehicle speed of the work vehicle.

In FIG. 5, F1 shows the case that the first forward gear 53 is connected with the stop motion lever shaft 52 by the first forward clutch 55; F2 shows the case that the second forward gear 62 is connected with the countershaft 61 by the second forward clutch 64; F3 shows the case that the third forward gear 63 is connected to the countershaft 61 by the third forward clutch 65; R shows the case that the reverse gear 54 is connected with the stop motion lever shaft 52 by the reverse clutch 56; respectively. For convenience of explanation, the low-speed driven gear 85 is assumed to be connected with the auxiliary transmission output shaft 83 by the auxiliary transmission clutch 86 in every case.

In the case that the first forward gear 53 is connected with the stop motion lever shaft 52 by the first forward clutch 55, or in the case that the reverse gear 54 is connected with the stop motion lever shaft 52 by the reverse clutch 56 (refer to F1 and R shown in FIG. 5), the vehicle speed V of the work vehicle 1 is equal to zero if the rotation speed N of the output shaft 44 remains to be equal to zero.

As shown by F1, in the case that the first forward gear 53 is connected with the stop motion lever shaft 52 by the first forward clutch 55, the vehicle speed V of the work vehicle 1 will rise if the rotation speed N of the output shaft 44 is increased.

When it reaches near the cross over point of F1 and F2, the first forward clutch 55 is disengaged, and the second forward gear 62 is connected with the countershaft 61 by the second forward clutch 64. In this case, as shown by F2, the vehicle speed V of the work vehicle 1 will rise if the rotation speed N of the output shaft 44 is decreased.

When it reaches near the cross over point of F2 and F3, the second forward clutch 64 is disengaged, and the third forward gear 63 is connected with the countershaft 61 by the third forward clutch 65. In this case, as shown by F3, the vehicle speed V of the work vehicle 1 will rise if the rotation speed N of the output shaft 44 is increased.

Moreover, as shown by R, in the case that the reverse gear 54 is connected with the stop motion lever shaft 52 by the reverse clutch 56, the vehicle speed V of the work vehicle 1 will decrease to a value less than zero if the rotation speed N of the output shaft 44 is increased. In other words, the work vehicle 1 will go backward.

In FIG. 5, the low-speed driven gear 85 is assumed to be connected with the auxiliary transmission output shaft 83 by the auxiliary transmission clutch 86. But, in the case that the high-speed driven gear 84 is connected with the auxiliary transmission output shaft 83 by the auxiliary transmission clutch 86, the mode of shifting gears is almost the same as the mode which is described above.

That is to say, in the case that the first forward gear 53 is connected with the stop motion lever shaft 52 by the first forward clutch 55, the vehicle speed V of the work vehicle 1 will rise if the rotation speed N of the output shaft 44 is increased.

In the case that the first forward clutch 55 is disengaged and the second forward gear 62 is connected with the countershaft 61 by the second forward clutch 64, the vehicle speed V of the work vehicle 1 will rise if the rotation speed N of the output shaft 44 is decreased.

In the case that the second forward clutch 64 is disengaged and the third forward gear 63 is connected with the countershaft 61 by the third forward clutch 65, the vehicle speed V of the work vehicle 1 will rise if the rotation speed N of the output shaft 44 is increased.

Moreover, in the case that the reverse gear 54 is connected with the stop motion lever shaft 52 by the reverse clutch 56, the vehicle speed V of the work vehicle 1 will decrease to a value less than zero if the rotation speed N of the output shaft 44 is increased. In other words, the work vehicle 1 will go backward.

When the high-speed driven gear 84 is connected with the auxiliary transmission output shaft 83, rate of change in the vehicle speed V to the rotation speed N of the output shaft 44 is larger than that of the case connecting the low-speed driven gear 85 with the auxiliary transmission output shaft 83.

Figure 6:
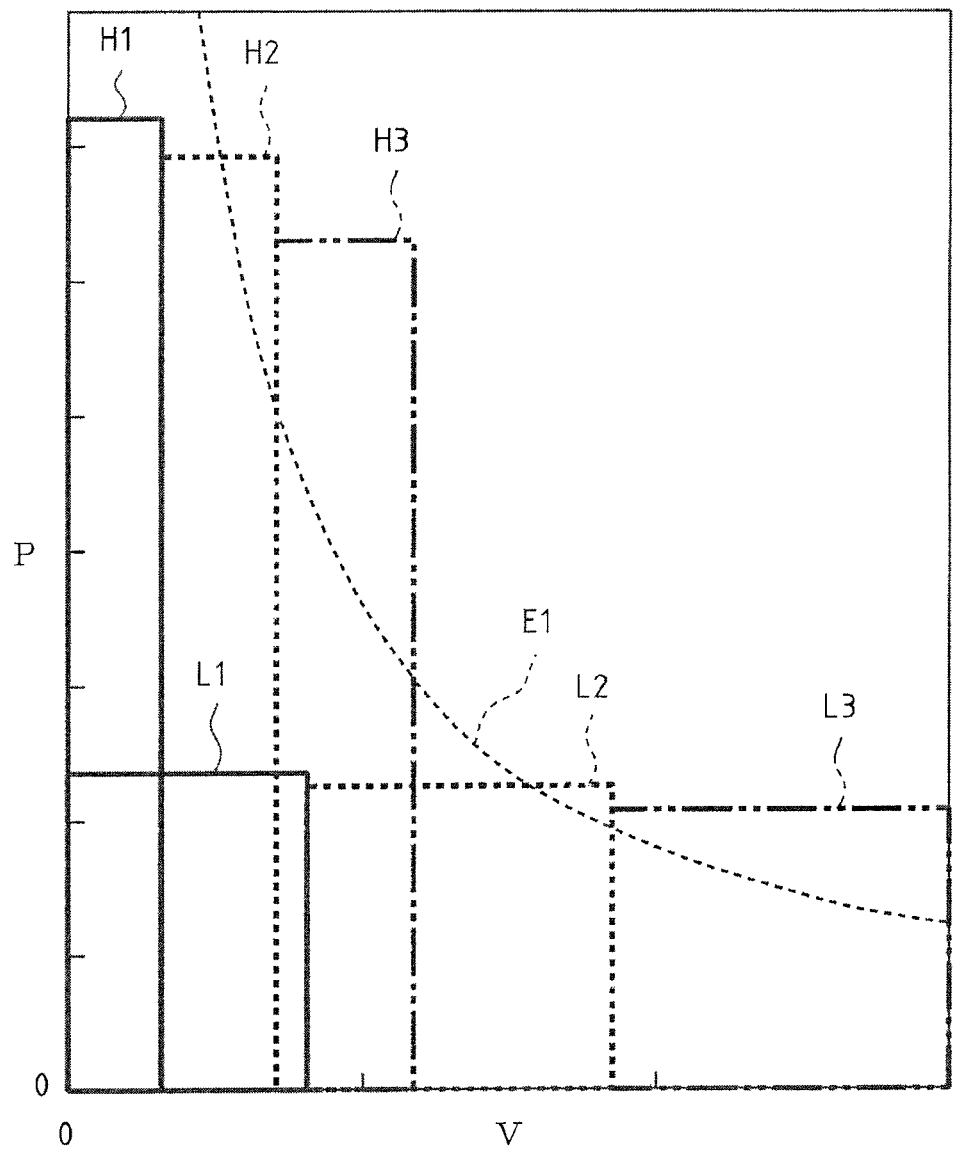
FIG. 6 It is a diagram showing the relation between tractive power and vehicle speed of the work vehicle in the first embodiment.

Next, relation between vehicle speed V and tractive power P of the work vehicle 1 is shown in FIG. 6, with regard to the work vehicle 1 comprising the above-mentioned transmission device 4.

A curved line E1 which is shown in FIG. 6 describes output power of the engine 3. Additionally, L1, L2, L3, H1, H2, and H3 show relation between vehicle speed V and tractive power P, each of them corresponding to below-mentioned respective conditions.

L1 and H1 show the case that the first forward gear 53 is connected with the stop motion lever shaft 52 by the first forward clutch 55; L2 and H2 show the case that the second forward gear 62 is connected with the countershaft 61 by the second forward clutch 64; L3 and H3 show the case that the third forward gear 63 is connected to the countershaft 61 by the third forward clutch 65; respectively.

Additionally, L1, L2, and L3 show the case that the low-speed driven gear 85 is connected with the auxiliary transmission output shaft 83 by the auxiliary transmission clutch 86; H1, H2, and H3 show the case that the high-speed driven gear 84 is connected with the auxiliary transmission output shaft 83 by the auxiliary transmission clutch 86; respectively.

As shown in FIG. 6, the transmission device 4 is composed of combination of the reversing clutch device 50, the combining clutch device 60, and the auxiliary transmission clutch 86. Accordingly, the transmission device 4 can correspond to output range of the engine 3, and thus, it can perform shifting gears corresponding to the output power of the engine 3. Moreover, by means of combining the continuously-variable transmission 40 and the planetary gear mechanism 70, only a few clutches (in regard to this embodiment, that means the reversing clutch device 50, the combining clutch device 60, and the auxiliary transmission clutch 86) are needed to be switched for altering the vehicle speed V in a wide range in the work vehicle 1. Accordingly, fine adjustment of the vehicle speed V can be performed only by adjustment of main transmission (adjustment of discharge rate of hydraulic oil by the oil hydraulic pump 42). Thus, it is easy to perform the shift transmission operation of the work vehicle 1.

In this embodiment, on the basis of axial direction of the input shaft 20, the continuously-variable transmission 40 is disposed behind the planetary gear mechanism 70. But the present invention is not limited to such configuration. That is to say, it is also possible to dispose the reversing clutch device 50 and the combining clutch device 60 between the continuously-variable transmission 40 and the planetary gear mechanism 70, disposing the planetary gear mechanism 70 behind the continuously-variable transmission 40, on the basis of axial direction of the input shaft 20.

Hereinafter, explanation will be given on a transmission device 204 which is a second embodiment of a transmission device. In this embodiment, components already described in the explanation of the transmission device 4 (refer to FIG. 2), which is the first embodiment, are denoted by the same reference numerals, and thus detailed description thereof will be omitted.

Figure 7:
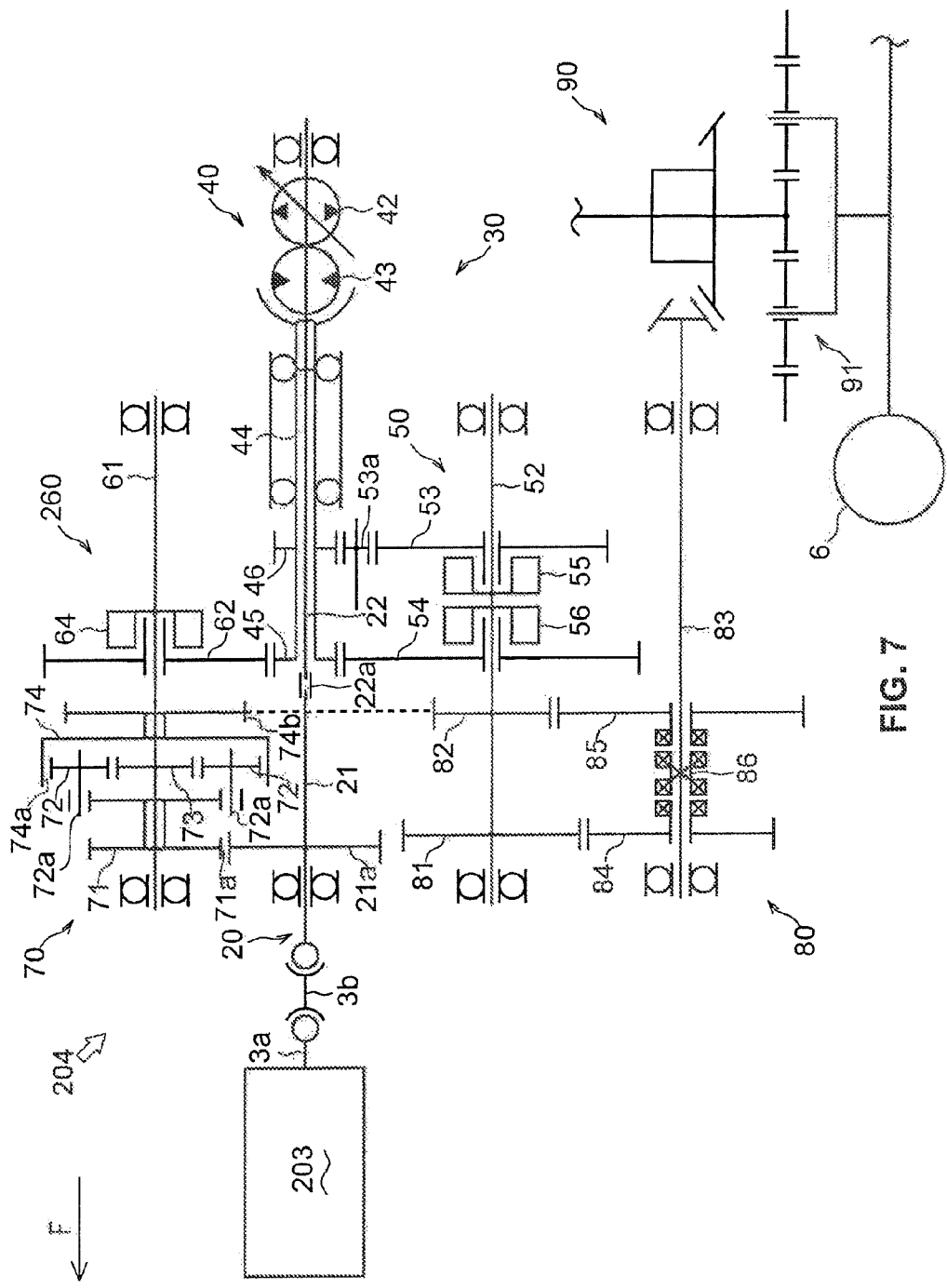
FIG. 7 It is a schematic diagram illustrating the transmission device which is a second embodiment of the present invention.

As shown in FIG. 7, the difference between the transmission device 204 and the transmission device 4 is that the transmission device 204 comprises a combining clutch device 260 instead of the combining clutch device 60. The difference between the combining clutch device 260 and the combining clutch device 60 is that the combining clutch device 260 does not comprise the third forward gear 63 and the third forward clutch 65.

Figure 8:
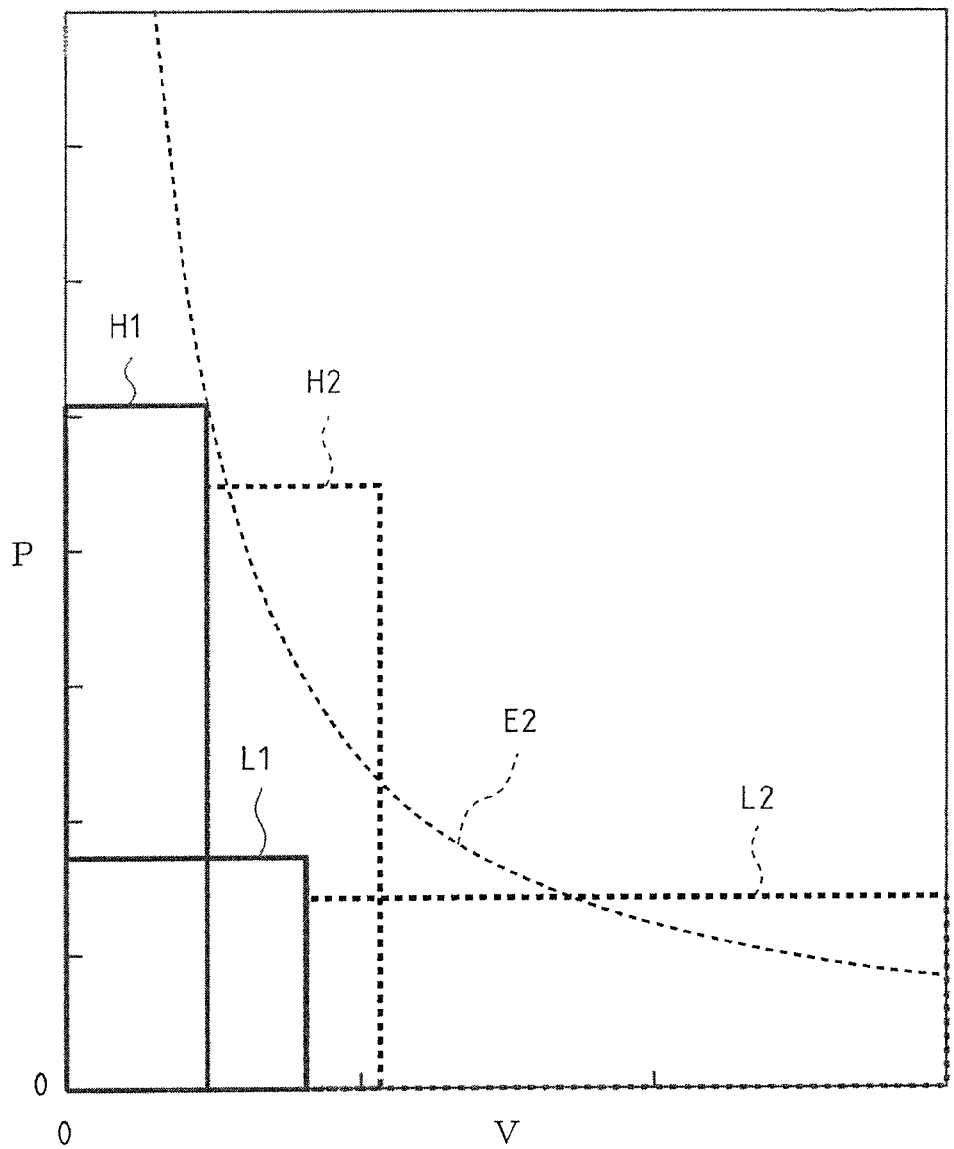
FIG. 8 It is a diagram showing the relation between tractive power and vehicle speed of the work vehicle in the second embodiment.

Next, relation between vehicle speed V and tractive power P of the work vehicle is shown in FIG. 8, with regard to the work vehicle comprising the above-mentioned transmission device 204.

A curved line E2 which is shown in FIG. 8 describes output power of the engine 203. Additionally, L1, L2, H1, and H2 show relation between vehicle speed V and tractive power P, each of them corresponding to below-mentioned respective conditions. Horsepower of the engine 203 is less than horsepower of the engine 3.

L1 and H1 show the case that the first forward gear 53 is connected with the stop motion lever shaft 52 by the first forward clutch 55; L2 and H2 show the case that the second forward gear 62 is connected with the countershaft 61 by the second forward clutch 64; respectively.

Additionally, L1 and L2 show the case that the low-speed driven gear 85 is connected with the auxiliary transmission output shaft 83 by the auxiliary transmission clutch 86; H1 and H2 show the case that the high-speed driven gear 84 is connected with the auxiliary transmission output shaft 83 by the auxiliary transmission clutch 86; respectively.

As shown in FIG. 8, the transmission device 204 is composed of combination of the reversing clutch device 50, the combining clutch device 260, and the auxiliary transmission clutch 86. Accordingly, the transmission device 204 can correspond to output range of the engine 203, and thus, it can perform shifting gears corresponding to the output power of the engine 203. Moreover, by means of combining the continuously-variable transmission 40 and the planetary gear mechanism 70, only a few clutches (in regard to this embodiment, that means the reversing clutch device 50, the combining clutch device 260, and the auxiliary transmission clutch 86) are needed to be switched for altering the vehicle speed V in a wide range in the work vehicle 1. Accordingly, fine adjustment of the vehicle speed V can be performed only by adjustment of main transmission (adjustment of discharge rate of hydraulic oil by the oil hydraulic pump 42). Thus, it is easy to perform the shift transmission operation of the work vehicle 1.

Additionally, as is obvious by comparing the transmission device 4 with the transmission device 204, it is possible to share the continuously-variable transmission 40, the reversing clutch device 50, and the planetary gear mechanism 70 among several different types of transmission devices even when each of them is for engine with different horsepower. Thus, by means of expanding the versatility of the continuously-variable transmission 40, the reversing clutch device 50, and the planetary gear mechanism 70, it is possible to commonalize components of various types of transmission devices and reduce component cost.

Hereinafter, explanation will be given on a transmission device 304 which is a third embodiment of a transmission device. In this embodiment, components already described in the explanation of the transmission device 4 (refer to FIG. 2), which is the first embodiment, are denoted by the same reference numerals, and thus detailed description thereof will be omitted.

Figure 9:
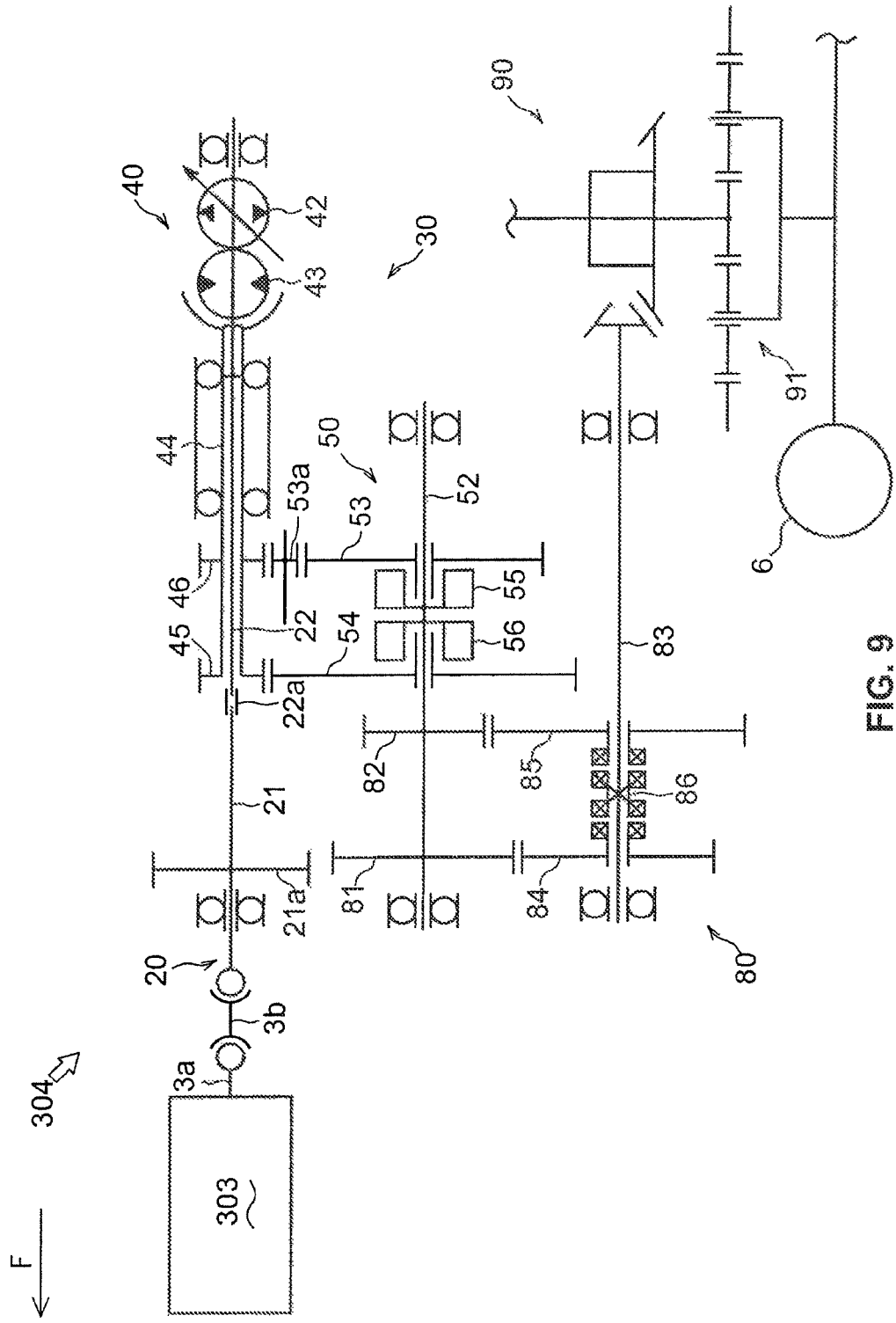
FIG. 9 It is a schematic diagram illustrating the transmission device which is a third embodiment of the present invention.

As shown in FIG. 9, the difference between the transmission device 304 and the transmission device 4 is that the transmission device 304 does not comprise the combining clutch device 60 and the planetary gear mechanism 70.

Figure 10:
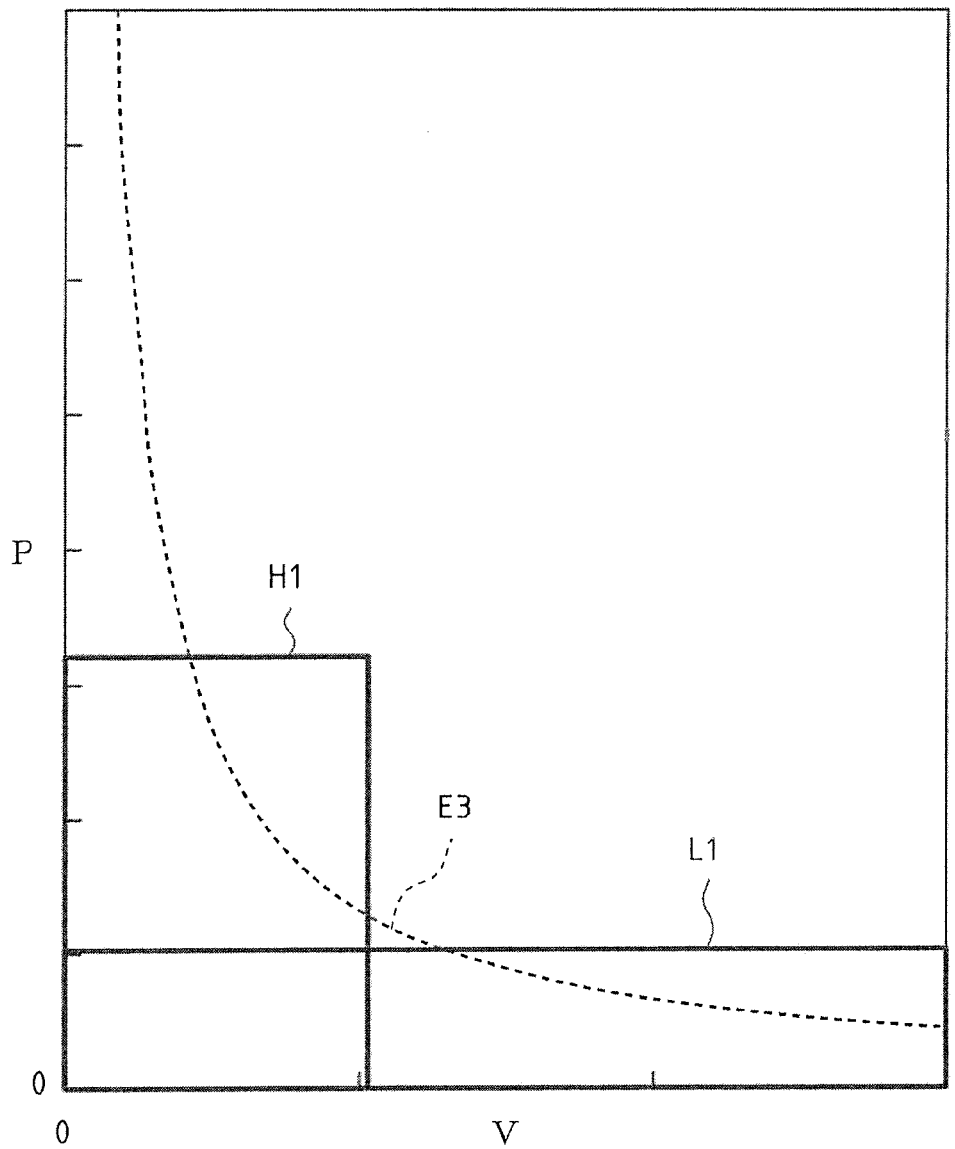
FIG. 10 It is a diagram showing the relation between tractive power and vehicle speed of the work vehicle in the third embodiment.

Next, relation between vehicle speed V and tractive power P of the work vehicle is shown in FIG. 10, with regard to the work vehicle comprising the above-mentioned transmission device 304.

A curved line E3 which is shown in FIG. 10 describes output power of the engine 303. Additionally, L1 and H1 show relation between vehicle speed V and tractive power P, each of them corresponding to below-mentioned respective conditions. Horsepower of the engine 303 is less than horsepower of the engine 203.

L1 and H1 show the case that the first forward gear 53 is connected with the stop motion lever shaft 52 by the first forward clutch 55.

Additionally, L1 shows the case that the low-speed driven gear 85 is connected with the auxiliary transmission output shaft 83 by the auxiliary transmission clutch 86; H1 shows the case that the high-speed driven gear 84 is connected with the auxiliary transmission output shaft 83 by the auxiliary transmission clutch 86; respectively.

As shown in FIG. 10, the transmission device 304 is composed of combination of the reversing clutch device 50 and the auxiliary transmission clutch 86. Accordingly, the transmission device 304 can correspond to output range of the engine 303, and thus, it can perform shifting gears corresponding to the output power of the engine 303.

Additionally, as is obvious by comparing the transmission device 4 with the transmission device 304, it is possible to share the continuously-variable transmission 40 and the reversing clutch device 50 among several different types of transmission devices even when each of them is for engine with different horsepower. Thus, by means of expanding the versatility of the continuously-variable transmission 40 and the reversing clutch device 50, it is possible to commonalize components of various types of transmission devices and reduce component cost.

As mentioned above, the transmission device 4 comprises: the input shaft 20 that transmits power from the engine 3; the continuously-variable transmission 40 that is disposed on the input shaft 20 and outputs power transmitted from the input shaft 20, steplessly converting the speed thereof; and the reversing clutch device 50 that outputs, either in a forward rotational direction or a reverse rotational direction, power outputted from the continuously-variable transmission 40. The reversing clutch device 50 is selectively switched and the gear ratio is steplessly changed by the continuously-variable transmission 40 so as to perform speed change operation.

The transmission device 4 for the work vehicle 1 is composed as described above. Therefore, the rotational direction of output power can be selectively switched by means of switching the reversing clutch device 50. Additionally, vehicle speed of the work vehicle 1 can be converted by means of changing the gear ratio steplessly by the continuously-variable transmission 40. Moreover, the continuously-variable transmission 40 and the reversing clutch device 50 are available as shift transmission elements of the transmission device for the work vehicle 1 by means of combining the continuously-variable transmission 40 and the reversing clutch device 50 with other shift transmission elements (for example, the planetary gear mechanism 70 or the like). Consequently, the continuously-variable transmission 40 and the reversing clutch device 50 can be used in various types of transmission devices (for example, transmission devices each of which corresponding to different amount of horsepower of drive source). By means of sharing the continuously-variable transmission 40 and the reversing clutch device 50 among various types of transmission devices, it is possible to reduce cost, reduce parts count, and shorten the development period.

Additionally, the transmission device 4 comprises: the combining clutch device 60 that outputs power outputted from the continuously-variable transmission 40; and the planetary gear mechanism 70 that combines power from the engine 3 and power outputted from the combining clutch device 60 into combined power and outputs the combined power. The reversing clutch device 50 and the combining clutch device 60 are selectively switched and the gear ratio is steplessly changed by the continuously-variable transmission 40 so as to perform speed change operation.

The transmission device 4 for the work vehicle 1 is composed as described above. Therefore, it is possible to output power directly from the continuously-variable transmission 40. And it is also possible to combine power from the continuously-variable transmission 40 and power from the engine 3 into combined power and output the combined power. Consequently, by means of selectively switching the reversing clutch device 50 and the combining clutch device 60, steplessly changing the gear ratio by the continuously-variable transmission 40, it is possible to convert vehicle speed of the work vehicle 1 in a wide range corresponding to the output power of the engine 3.

Additionally, the transmission device 4 comprises: the planetary gear mechanism 70 that combines power from the engine 3 and other power into combined power and outputs the combined power; and the combining clutch device 60 that outputs power or transmits power to the planetary gear mechanism 70 outputted from the reversing clutch device 50. The reversing clutch device 50 and the combining clutch device 60 are selectively switched, and the gear ratio is steplessly changed by the continuously-variable transmission 40 so as to perform speed change operation.

The transmission device 4 for the work vehicle 1 is composed as described above. Therefore, it is possible to output power directly from the continuously-variable transmission 40. And it is also possible to combine power from the continuously-variable transmission 40 and power from the engine 3 into combined power and output the combined power. Consequently, by means of selectively switching the reversing clutch device 50 and the combining clutch device 60, steplessly changing the gear ratio by the continuously-variable transmission 40, it is possible to convert vehicle speed of the work vehicle 1 in a wide range corresponding to the output power of the engine 3.

Additionally, in regard to the transmission device 4, the input shaft 20 that transmits power from the engine 3, the continuously-variable transmission 40 that is disposed on the input shaft 20 and outputs power transmitted from the input shaft 20, steplessly converting the speed thereof, and the reversing clutch device 50 that outputs, either in a forward rotational direction or a reverse rotational direction, power outputted from the continuously-variable transmission 40 are disposed upstream of the differential gear mechanism 90, which distributes power to the right rear wheel 6 and the left rear wheel 6, on the power transmission course.

The transmission device 4 for the work vehicle 1 is composed as described above. Therefore, the transmission device 4 is capable of being corresponded to the high-horsepower engine 3 without growth of the transmission device 4 in size. Moreover, the continuously-variable transmission 40 and the reversing clutch device 50 is capable of being used with various types of transmission devices, and thus, it is possible to commonalize components for the sake of cutting costs.

Additionally, in regard to the transmission device 4, the planetary gear mechanism 70 is disposed between the input shaft 20 and the differential gear mechanism 90. The carrier 71 of the planetary gear mechanism 70 is interlocked with the input shaft 20. The sun gear 73 of the planetary gear mechanism 70 is interlocked with the continuously-variable transmission 40. The outer gear 74 of the planetary gear mechanism 70 is interlocked with the auxiliary transmission output shaft 83.

The transmission device 4 for the work vehicle 1 is composed as described above. Therefore, by means of combining the continuously-variable transmission 40 with the planetary gear mechanism 70, it is possible to convert vehicle speed V of the work vehicle 1 in a wide vehicle speed range. Moreover, by means of combining the continuously-variable transmission 40 with the planetary gear mechanism 70, it is possible to inhibit reduction of power transmission efficiency on the power transmission course.

Furthermore, in regard to the transmission device 4, on the basis of axial direction of the input shaft 20, the reversing clutch device 50 and the combining clutch device 60 that outputs power transmitted from the planetary gear mechanism 70 are disposed between the planetary gear mechanism 70 and the continuously-variable transmission 40.

The transmission device 4 for the work vehicle 1 is composed as described above. Therefore, it is possible to make the transmission device 4 compact, and thus it will be easier to load the transmission device 4 on the work vehicle 1. Moreover, the clutches are capable of being located close to each other. Thus, structure of oil hydraulic circuit for controlling the motion of the clutches will be simplified.

Furthermore, the continuously-variable transmission 40 is disposed near the rear side of a transmission case 10.

The transmission device 4 for the work vehicle 1 is composed as described above. Therefore, the continuously-variable transmission 40, which should be maintained relatively at short intervals, is located at place where it can be maintained easily from behind the work vehicle 1. Accordingly, ease of maintenance will improve.

INDUSTRIAL APPLICABILITY

The present invention can be employed for art of transmission device installed in work vehicles. In particular, the present invention can be employed for art of power transmission which is done inside transmission device.

The invention claimed is:

1. A transmission system comprising:
   a continuously variable transmission including an input part, an output part and a speed control device for setting a speed ratio of the output part to the input part in a range between a minimum speed ratio and a maximum speed ratio;
   an output member;
   a reverse drive train, a first forward speed drive train, and a second forward speed drive train arranged in parallel to one another;
   a reverse clutch for drivingly connecting the output member to the output part of the continuously variable transmission via the reverse drive train;
   a first forward clutch for drivingly connecting the output member to the output part of the continuously variable transmission via the first forward speed drive train;
   a second forward clutch for drivingly connecting the output member to the output part of the continuously variable transmission via the second forward speed drive train; and
   a planetary gear mechanism,
   wherein when the second forward clutch is engaged, the planetary gear mechanism combines a rotary power inputted from the input part of the continuously variable transmission with a rotary power inputted from the output part of the continuously variable transmission via the second forward speed drive train, and outputs a resultant force to the output member,
   wherein one of the reverse clutch, the first forward clutch, and the second forward clutch is selectively engaged to drivingly connect the output member to the output part of the continuously variable transmission via one selected among the reverse drive train, the first forward speed drive train and the second forward speed drive train,
   wherein in a first range where the reverse drive train is selected to drivingly connect the output member to the output part of the continuously variable transmission by selectively engaging the reverse clutch, increase of speed of the output member rotating in a reverse direction from minimum to maximum corresponds to increase of the speed ratio set by the speed control device of the continuously variable transmission from the minimum speed ratio to the maximum speed ratio,
   wherein in a second range where the first forward speed drive train is selected to drivingly connect the output member to the output part of the continuously variable transmission by selectively engaging the first forward clutch, increase of speed of the output member rotating in a normal direction from minimum to maximum corresponds to increase of the speed ratio set by the speed control device of the continuously variable transmission from the minimum speed ratio to the maximum speed ratio, and wherein in a third range where the second forward speed drive train is selected to drivingly connect the output member to the output part of the continuously variable transmission by selectively engaging the second forward clutch, increase of speed of the output member rotating in the normal direction from minimum to maximum corresponds to reduction of the speed ratio set by the speed control device of the continuously variable transmission from the maximum speed ratio to the minimum speed ratio, wherein the speed ratio of the continuously variable transmission reaches the minimum speed ratio at a transition between the first range and the second range, and the speed ratio of the continuously variable transmission reaches the maximum speed ratio at a transition between the second range and the third range.

2. The transmission system according to claim 1, wherein the speed control device of the continuously variable transmission has a neutral position, and is movable in first and second directions opposite each other with respect to the neutral position, wherein, when the speed control device is disposed at the neutral position, the continuously variable transmission has the input part and the output part rotating at an equal speed in the same direction, wherein, according to the movement of the speed control device in the first direction from the neutral position, the output part rotates relative to the input part so as to reduce the speed ratio of the continuously variable transmission to the minimum speed ratio, and wherein, according to the movement of the speed control device in the second direction from the neutral position, the output part rotates relative to the input part so as to increase the speed ratio of the continuously variable transmission to the maximum speed ratio.

* * * * *